United States Patent Office 3,232,940
Patented Feb. 1, 1966

3,232,940
PREPARATION OF AMMONIUM NITRATES
Robert A. Bernoff, Lynnewood Gardens, Elkins Park, and David M. Gardner, North Wales, Pa., assignors to Pennsalt Chemicals Corporation, Philadelphia, Pa., a corporation of Pennsylvania
No Drawing. Filed May 18, 1960, Ser. No. 29,779
12 Claims. (Cl. 260—268)

This invention relates to a novel process for making alkyl ammonium nitrates and particularly deals with an improved process for preparing high purity alkyl ammonium nitrates by a methathetical reaction between quaternary amonium chlorides and nitric acid.

Alkyl ammonium nitrates and particularly quaternary ammonium nitrates are important chemical compounds useful as fertilizers, disinfectants, and more recently as rocket propellants. In the latter application it is imperative that the compounds be of high purity and be free of alkali metal and halide atoms because these contaminants seriously affect the efficiency of the propellant by lowering its specific impulse and adversely affecting its thermal and shock sensitivity.

The complete conversion of chloride salts to nitrates by treatment of the chloride with nitric acid has long been recognized as a difficult and challenging problem. The problem is discussed somewhat in U.S.P. 1,036,611 where it is reported that a portion of the nitric acid "always escapes from the conversion" and in order to obtain improved yields and efficiencies the patent suggests (1) operating with nitric acid concentrations below 35%, (2) conducting the process at reduced pressures so as to maintain a temperature below 80° C., and (3) removing and recovering the nitrous vapors from the hydrochloric acid removed. Even with these controls, the best yields of nitrates that can be obtained from alkali metal and alkaline earth chlorides is 93%.

It is also known in the literature (Mehring et al., Ind. Eng. Chem. 21, 379 (1929)), to convert inorganic chlorides (e.g. KCl) to the corresponding nitrate by addition of nitric acid to aqueous inorganic chloride solutions and (a) evaporating to dryness, (b) digesting with equivalent amounts of KCl and $HNO_3$ while maintaining the solution at constant volume, or (c) boiling equivalent amounts of reagents under reflux. However, these methods result in formation of chlorine and loss of nitrogen, either as nitric acid or due to formation of nitrosyl chloride. In addition, separation of the components becomes difficult leading the author to conclude that these techniques offer little promise of commercial application.

In view of the above it is to be expected that use of nitric acid to convert alkyl ammonium halides to the corresponding nitrates would not result in a simple metathetical reaction, but that halogenation and/or nitration of the organic portion of the amine salt would occur resulting in numerous by-products and degradation products.

Surprisingly, however, it has now been found that high yields of high purity alkyl ammonium nitrates free from halide contamination can be obtained by the process of this invention which comprises azeotropically distilling an aqueous nitric acid solution containing an alkyl ammonium chloride until the condensate is free of chloride ion and separating the pure alkyl ammonium nitrate from the distillation residue.

The process of this invention is carried out quite readily without the need for special equipment or unusual conditions. The alkyl ammonium chloride is first dissolved in an aqueous nitric acid solution containing an amount of nitric acid at least stoichiometrically equivalent to the amount of alkyl ammonium chloride. Preferably, the concentration of the nitric acid solution will be about 30% to 40% by weight and the appropriate amount of quaternary halide added. However, the process may be carried out with nitric acid solutions containing a higher or lower concentration, although for reasons of safety it is preferred to keep the nitric acid concentration below about 80% by weight. It will be understood that a stoichiometric excess of nitric acid may be used, but less than an equivalent amount will result in incomplete conversion of the chloride salt. Usually a small excess of the nitric acid (about at least 10% by weight) is advantageously used.

The distillation step is also straightforward and is carried out at the temperature of the hydrochloric acid-water azeotrope which forms (i.e. about 110° C. at 760 mm.). If desired, the process may also be carried out under reduced pressures and because this enables lower temperatures to be used, distillation at reduced pressures is of particular value when using higher concentrations of nitric acid.

The distillation step is continued until chloride ion is no longer present in the distillate, thus, indicating complete metathetical conversion of the quaternary salt to nitrate. This is readily determined by testing a sample of the distillate with silver nitrate and observing if a precipitate of silver chloride is present. When no such precipitate is obtained distillation is stopped and the quaternary ammonium nitrate in the still residue is ready for isolation.

Isolation of the alkyl ammonium nitrate product may be accomplished by any of the conventional means known in the art. For example, the still residue may be cooled and the product crystallized out. If necessary, part of the still residue may be evaporated to aid crystallization. The product is then simply filtered off, washed briefly if desired, and dried in air, usually at 100° to 110° C. Alternately, the liquid still residue may be treated with an organic solvent in which the nitrate salt is insoluble to thus precipitate the nitrate salt from solution. In this technique, a solvent miscible with water will be preferred, such as alcohols (e.g. methanol, ethanol, isopropanol, etc.), ketones (e.g. acetone), and certain ethers (e.g. dioxane). The product is again simply filtered off and air dried.

The process of this invention is operable only with alkyl ammonium chlorides, other halide salts being inoperable for several reasons. Alkyl ammonium fluorides are inoperable due to the fact that water and nitric acid form an azeotrope boiling at 120° C. at 760 mm. and the water azeotrope with HF boils above this temperature. Thus, when using fluoride salts, the water-nitric acid azeotrope distills first and removes the nitrate radical from the system. With alkyl ammonium bromides and iodides the same consideration would also hold, but iodides and bromides are rapidly oxidized to iodine and bromine by the nitric acid in the system.

Although the process of this invention may be carried out with any alkyl ammonium chloride, it is preferred to use the process with quarternary ammonium chlorides. Such quaternary ammonium chloride reactants are well known compounds and may be selected from any of the wide variety existing. When using this process to prepare high energy fuels, the quaternary ammonium compound selected will usually be a rather compact molecule, as for example the tetra-lower alkyl ammonium halides, the quaternary ammonium salts of polyamines (e.g. diamines, triamines, etc.), the quaternary ammonium salts of polyalkylene-polyamines (e.g. those quaternaries from piperazines and triethylenediamine) and the like. Examples of such quaternary salts include those obtained by quaternizing trimethylamine, dimethylethylamine, triisopropylamine, tributylamine, triethylamine, triamylamine, N,N,N',N'-tetramethyethylenediamine, N,-N'-dimethyldiethylenediamine (i.e., N,N'-dimethylpiperazine), triethylenediamine and diethylene methylethylenediamine with an alkyl halide such as methyl chloride and ethyl chloride. In lieu of the alkyl and alkylene amine derived quaternary compounds others may also be used, as for example those obtained by the action of benzyl chloride on other tertiary aromatic and heterocyclic amines such as pyridine and its derivatives, N-alkyl piperidines, N,N-dimethylaniline, diphenylmethylamine and the like. Some specific quaternary ammonium compounds of particular value as intermediates to nitrate salts for rocket fuels are trimethylisopropylammonium chloride, trimethylethylammonium chloride, dimethyldiethylammonium chloride, dimethyl-tert-butyl-ethylammonium chloride, triethylisopropylammonium chloride, N,N'-tetramethyl-n-propylenediammonium dichloride and N,N'-tetramethylethylenediammonium dichloride, N,N'-dimethyltriethylenediammonium dichloride, N,N'-diethyltriethylenediammonium dichloride, N-methyl-N'-ethyltriethylenediammonium dichloride, N-methyl-N'-isopropyltriethylenediammonium dichloride, and N,N'-dimethyldiethylenepropylenediammonium dichloride, i.e.,

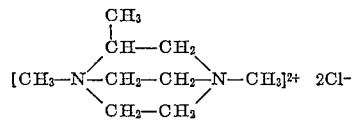

Many of these triethylenediamine derivatives are described and their preparation given in S.N. 799,115, filed March 13, 1959, in the names of T. E. Deger and H. Q. Smith, and now Patent No. 3,063,880.

Since nitrates are frequently desired because of their somewhat higher water solubility than chlorides, this process has particular value with those high molecular weight quaternary chlorides used as disinfectants in aqueous solutions. Many of these compounds are described on pages 210 to 224 of the book entitled "Surface Active Agents" by Schwartz, Perry and Berch, vol. II, Interscience Publishers, 1958, and these compounds are readily converted to the corresponding nitrates by the process of this invention.

As indicated, in addition to using quaternary ammonium chlorides of the above types alkyl amine halides which are not quaternaries may also be used in this process. These amine halides may be derived from primary, secondary or tertiary mono- or polyamines, particularly the lower alkyl amines (e.g. methylamine, diethylamine, n-butylamine, triethylamine, etc.). In U.S. Patent 2,919,-541 there are listed a large number of such polyamines which have utility in certain rocket fuel formulations and the chlorides of these polyamines may be converted to nitrates by the process of this invention to thereby increase the energy available from these amine compounds.

The following examples will serve to further illustrate the invention (all parts are by weight):

*Example 1.—Dimethytriethylenediammonium dinitrate*

A solution of 4.3 parts of dimethyltriethylenediammonium dichloride in 24.4 parts of 35% nitric acid is prepared. The solution is distilled at a head temperature of 110° C. until a silver nitrate test on the distillate is negative. At this point the head temperature is 120° C. Then, the liquid in the still residue is evaporated to about 20% of it original volume and it is cooled to 0° C. After standing at this temperature for one hour, the crystals which form are filtered off and dried at 100° C. The yield of pure chloride-free dimethyltriethylenediammonium dinitrate is 5.2 parts (98% of theory) based on the starting dichloride.

*Example 2.—Tetramethylammonium nitrate*

A solution of 1.8 parts of tetramethylammonium chloride in 7.3 parts of 35% nitric acid is prepared. This solution is distilled until the distillate is chloride free at which point the head temperature is 115° C. The still residue is cooled to 0° C. and the white crystals which formed are filtered off, washed with acetone and air dried. The product (2.2 parts) obtained in 98% yield is pure chloride-free tetramethylammonium nitrate.

*Example 3.—Tetra-n-butylammonium nitrate*

Following the details of Example 2, tetra-n-butylammonium chloride is reacted with 35% nitric acid solution and pure tetra-n-butylammonium nitrate is isolated in essentially quantitative yield.

*Example 4*

The procedure of Example 1 is followed using instead of dimethyltriethylenediammonium dichloride, N,N'-dimethyldiethylenepropylenediammonium dichloride in a four times molar excess of 35% nitric acid. Pure N,N'-dimethyldiethylenepropylenediammonium dinitrate is obtained is essentially quantitative yield.

In like manner N,N'-diethyltriethylenediammonium dichloride, N-methyl-N'-ethyltriethylenediammonium dichloride, and N-methyl-N'-isopropyltriethylenediammonium dichloride each give the pure dinitrate in essentially quantitative yield.

It will be understood that numerous variations and permutations may be made from the above description and examples without departing from the spirit and scope of the invention.

We claim:

1. A process for the preparation of alkyl ammonium nitrates which comprises distilling an azeotrope of HCl and water from an aqueous solution containing an alkyl ammonium chloride and at least a stoichiometric amount of nitric acid, continuing said distillation until the distillate is free of chloride ion.

2. A process for the preparation of quaternary ammonium nitrates which comprises distilling an azeotrope of HCl and water from an aqueous solution containing a quaternary ammonium chloride and at least a stoichiometric amount of nitric acid, said quaternary ammonium chloride being obtained by quaternizing with a lower alkyl chloride, a tertiary amine selected from the group of lower alkyl amines and N,N'-lower alkyl polyalkylenediamines, continuing said distillation until the distillate is free of chloride ion and separating pure quaternary ammonium nitrate from the distillation residue.

3. The process of claim 2 wherein the quaternary ammonium chloride is a tetra-lower alkyl quaternary ammonium chloride.

4. The process of claim 2 wherein the quaternary ammonium chloride is tetramethylammonium chloride.

5. The process of claim 2 wherein the quaternary ammonium chloride is tetra-n-butyl-ammonium chloride.

6. The process of claim 2 wherein the quaternary ammonium chloride is derived from a polyalkylenepolyamine.

7. The process of claim 2 wherein the quaternary ammonium chloride is derived from an N,N'-di-(lower alkyl) substituted triethylenediamine.

8. The process of claim 7 wherein the quaternary ammonium chloride is N,N' - dimethyltriethylenediammonium dichloride.

9. The process of claim 7 wherein the quaternary ammonium chloride is N,N'-diethyltriethylenediammonium dichloride.

10. The process of claim 7 wherein the quaternary ammonium chloride is N-methyl-N'-ethyltriethylenediammonium dichloride.

11. The process of claim 7 wherein the quaternary ammonium halide is N-methyl-N-isopropyltriethylenediammonium dichloride.

12. The process of claim 7 wherein the quaternary ammonium halide is N,N'-dimethyldiethylenepropylenediammonium dichloride.

References Cited by the Examiner

Baniel et al.: C. A., vol. 52, pp. 12340–12341 (1958).
Ing et al.: J. Chem. Soc. (London), vol. of 1926, pages 1655–1668.

NICHOLAS S. RIZZO, *Primary Examiner.*

LEON ZITVER, *Examiner.*